United States Patent
Leriget

(10) Patent No.: US 6,899,940 B2
(45) Date of Patent: May 31, 2005

(54) ABSORBENT MAT ASSEMBLY

(76) Inventor: Peter Steven Leriget, 2101 Estates Dr., Nampa, ID (US) 83686

( * ) Notice: Subject to any disclaimer, the term of this patent is extended or adjusted under 35 U.S.C. 154(b) by 63 days.

(21) Appl. No.: 10/607,284

(22) Filed: Sep. 22, 2003

(65) Prior Publication Data
US 2004/0028871 A1 Feb. 12, 2004

Related U.S. Application Data

(63) Continuation-in-part of application No. 09/837,906, filed on Apr. 18, 2001, now abandoned, which is a continuation-in-part of application No. 09/408,090, filed on Sep. 29, 1999, now abandoned.

(51) Int. Cl.$^7$ ................................................. B32B 3/02
(52) U.S. Cl. ..................... 428/68; 428/99; 428/119; 428/172; 296/38; 184/106; 220/573
(58) Field of Search ........................... 428/68, 74, 81, 428/99, 119, 172; 296/38; 184/106; 220/573; 15/215

(56) References Cited

U.S. PATENT DOCUMENTS

| | | | |
|---|---|---|---|
| 3,797,796 A | 3/1974 | Lansdowne | 245/346.1 |
| 4,089,498 A | 5/1978 | Woodruff | 248/346.1 |
| 4,497,147 A | 2/1985 | Clapper et al. | 52/105 |
| 4,695,088 A | 9/1987 | Jensen | 296/38 |
| 4,801,005 A | 1/1989 | Hahn et al. | 141/98 |
| 4,858,872 A | 8/1989 | Witt | 248/346.1 |
| 5,011,007 A | 4/1991 | Kenimer | 206/205 |
| 5,266,378 A | 11/1993 | Stephenson et al. | 428/156 |
| 5,270,089 A | 12/1993 | Alston et al. | 428/60 |
| 5,500,267 A | 3/1996 | Canning | 428/68 |
| 5,549,178 A | 8/1996 | Yuhas | 184/106 |
| 5,549,945 A | 8/1996 | Lind | 428/35.5 |
| 5,834,385 A | 11/1998 | Blaney et al. | 442/382 |
| 5,928,751 A | 7/1999 | Van Romer et al. | 428/68 |

Primary Examiner—Alexander S. Thomas
(74) Attorney, Agent, or Firm—Joseph W. Holland

(57) ABSTRACT

An absorbent mat assembly including a petroleum resistant mat having a bottom panel and a raised perimeter forming a recess. An absorbent pad is placed within the recess and a fluid permeable backflow prevention member and a fluid permeable mesh are placed over the absorbent pad and secured to the mat using a plurality of mesh connectors. In the preferred embodiment of the invention, the absorbent pad includes a recyclable, washable and reusable material such as a polypropylene absorbent pad. The mat may be formed of a compound including recycled tires. The backflow prevention member and the mesh may be formed of a solvent or petroleum resistant material such as a high density polyethylene. The absorbent mat assembly may also include a connector strip for connecting two mats together along a marginal edge.

17 Claims, 7 Drawing Sheets

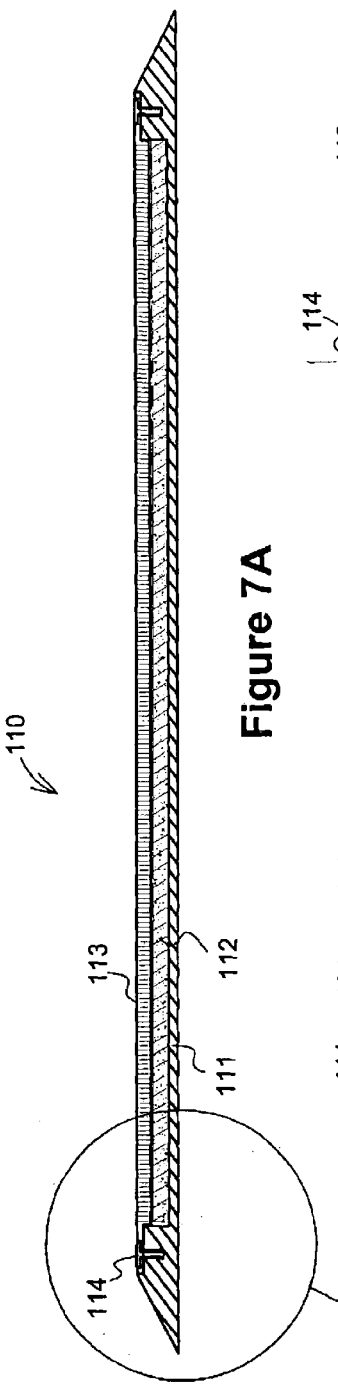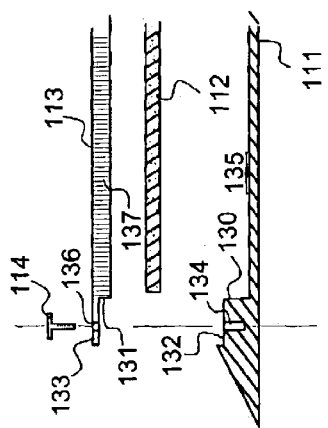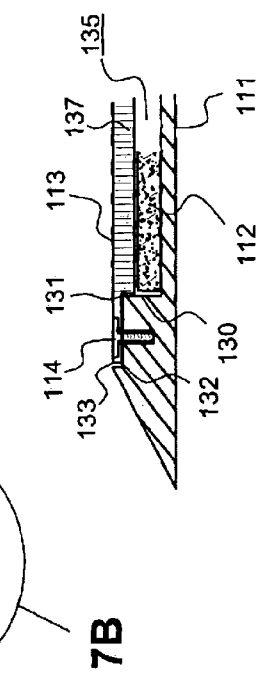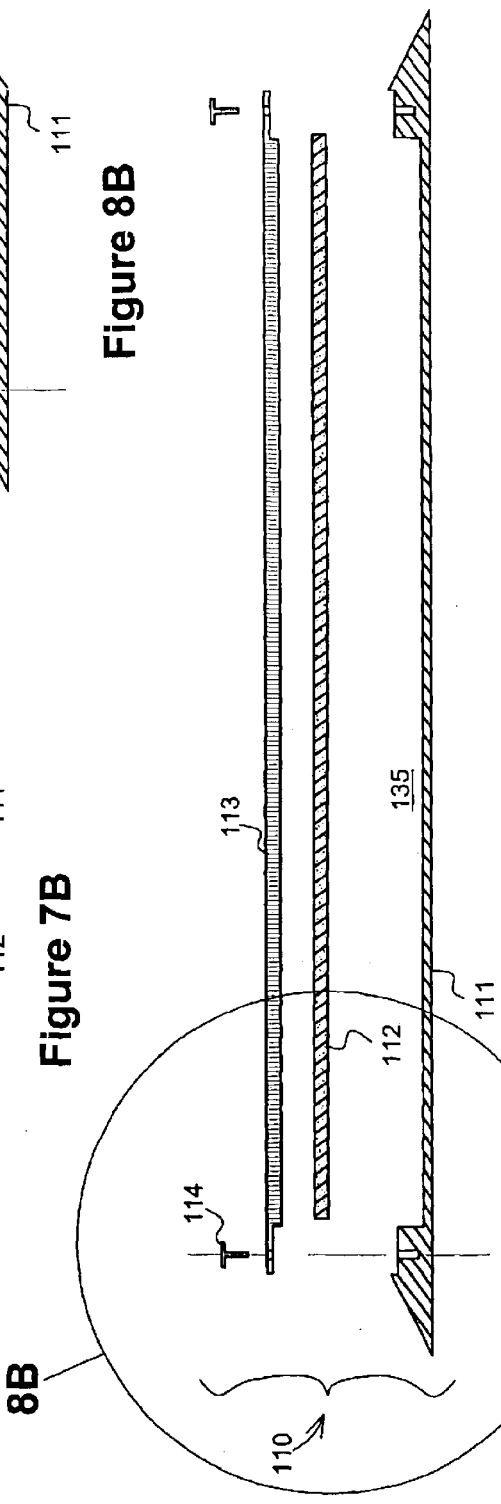

ABSORBENT MAT ASSEMBLY

RELEATED APPLICATION

This application is a continuation-in-part of application Ser. No. 09/837,906, entitled Absorbent Mat Assembly filed Apr. 18, 2001 abandoned which is a continuation-in-part of application Ser. No. 09/408,090, entitled Absorbent Mat Assembly filed Sep. 29, 1999 abandoned.

BACKGROUND OF THE INVENTION

1. Technical Field

The present invention relates generally to devices for containing spills and more specifically to a device for containing solvent and petroleum drippings.

2. Background

During the maintenance of engines and other equipment, there is a need to provide a means for the containment of spills of oil and other lubricants, which may occur both accidentally and casualty. Similarly, as vehicles and various other motorized equipment age, it is more likely that their engines will begin to drip various engine fluids including oil, grease and antifreeze through various gaskets and seals.

A variety of solutions have been proposed for containing such spills and drippings including devices which provide for an absorbent material to be placed within an impermeable base or tray. Generally speakin, these devices have employed materials containing a cellulose component, an absorbent material. At least one problem with such systems is that, once the absorbent material has been soiled to the point that it no longer functions, disposal becomes a problem. Kenimer, U.S. Pat. No. 5,011,007, discloses a reservoir containing garage mat constructed of a semi-rigid material into which one or more unfolded sections of newspaper are placed as an absorbent material. The absorbent material is then covered with a mesh cover and is secured to the mat between the mat top, which is configured having a tongue formed about its peripheral edge, and the mat itself, which is configured having a separate groove to accept the tongue in a cooperating manner. At least two limitations exist with this arrangement. First, newspaper is not a particularly absorbent material and following its use it must be disposed of in a manner that is environmentally acceptable. A second limitation is found in the configuration of the top mat and the manner in which it cooperates with the lower mat. This configuration is relatively costly to manufacture and relatively difficult to assemble and disassemble.

Yuhas, U.S. Pat. No. 5,549,178, discloses an oil absorbent pad which includes a corrugated cardboard which is stacked on edge to form an absorbent surface. The device also includes an outside peripheral upstanding edge which is coated with oil and waterproofing material to contain oil or other drippings captured by the absorbent pad. This arrangement lacks structural rigidity and, once again, presents limitations in terms of disposing of the device once it has reached a point of saturation.

What is needed is an absorbent mat assembly which is relatively low-cost to manufacture, simple to assemble and which includes a recyclable, washable and reusable absorbent pad.

SUMMARY OF THE INVENTION

According to the present invention, an absorbent mat assembly includes a petroleum resistant mat including a raised perimeter forming a recess. The mat may include a bottom panel and a side member attached to and extending from the bottom panel forming the recess. An absorbent pad is placed within the recess and a fluid permeable mesh is placed over the absorbent pad and secured to the petroleum resistant mat using a plurality of connectors. In one preferred embodiment of the invention, the absorbent mat assembly includes a backflow prevention member.

In the preferred embodiment of the invention, the absorbent pad includes a recyclable, washable and reusable material such as a polypropylene absorbent pad such as those manufactured by the 3M company and sold as "Sorbents". In one embodiment of the invention, the absorbent pad is configured having a woven polypropylene backer and a spun polypropylene liner attached to the woven polypropylene backer. Also, in the preferred embodiment of the invention, the mat is formed of a compound including recycled tires. The fluid permeable mesh may be formed of a solvent or petroleum resistant material such as an extruded polymeric. In one embodiment of the invention, the fluid permeable mesh is formed of a high density polyethylene.

The backflow prevention member may be formed of a sheet of solvent or petroleum resistant sheet material such as an extruded polymeric. The sheet material includes a plurality of perforations of any of a variety of shapes such that a fluid will be transported through the plurality of perforations and will be held below the backflow prevention member by capillary action of the absorbent pad. In addition, the backflow prevention member supports the fluid permeable mesh and distributes forces exerted against the fluid permeable mesh evenly, reducing pressure points along the grid. Because forces exerted against the fluid permeable mesh are more evenly distributed and pressure points along the grid are reduced, fluid that has passed below the backflow prevention member is less likely to be forced back to the upper surface of the grid. Another preferred embodiment of the invention includes a connector strip for attaching two or more absorbent mat assemblies in a side by side or end to end engagement.

Other advantages will become apparent to those skilled in the art from the following detailed description read in conjunction with the appended claims.

BRIEF DESCRIPTION OF THE DRAWINGS

FIG. 7A is a side cross-sectional representational view of one embodiment of an absorbent mat assembly according to the present invention;

FIG. 7B is a cross-sectional representational detail view of one embodiment of an absorbent mat assembly according to the present invention;

FIG. 8A is an exploded cross-sectional representational view of one embodiment of an absorbent mat assembly according to the present invention; and FIG. 8B is a cross-sectional representational detail view of one embodiment of an absorbent mat assembly according to the present invention.

DETAILED DESCRIPTION OF THE INVENTION

Figure 1:
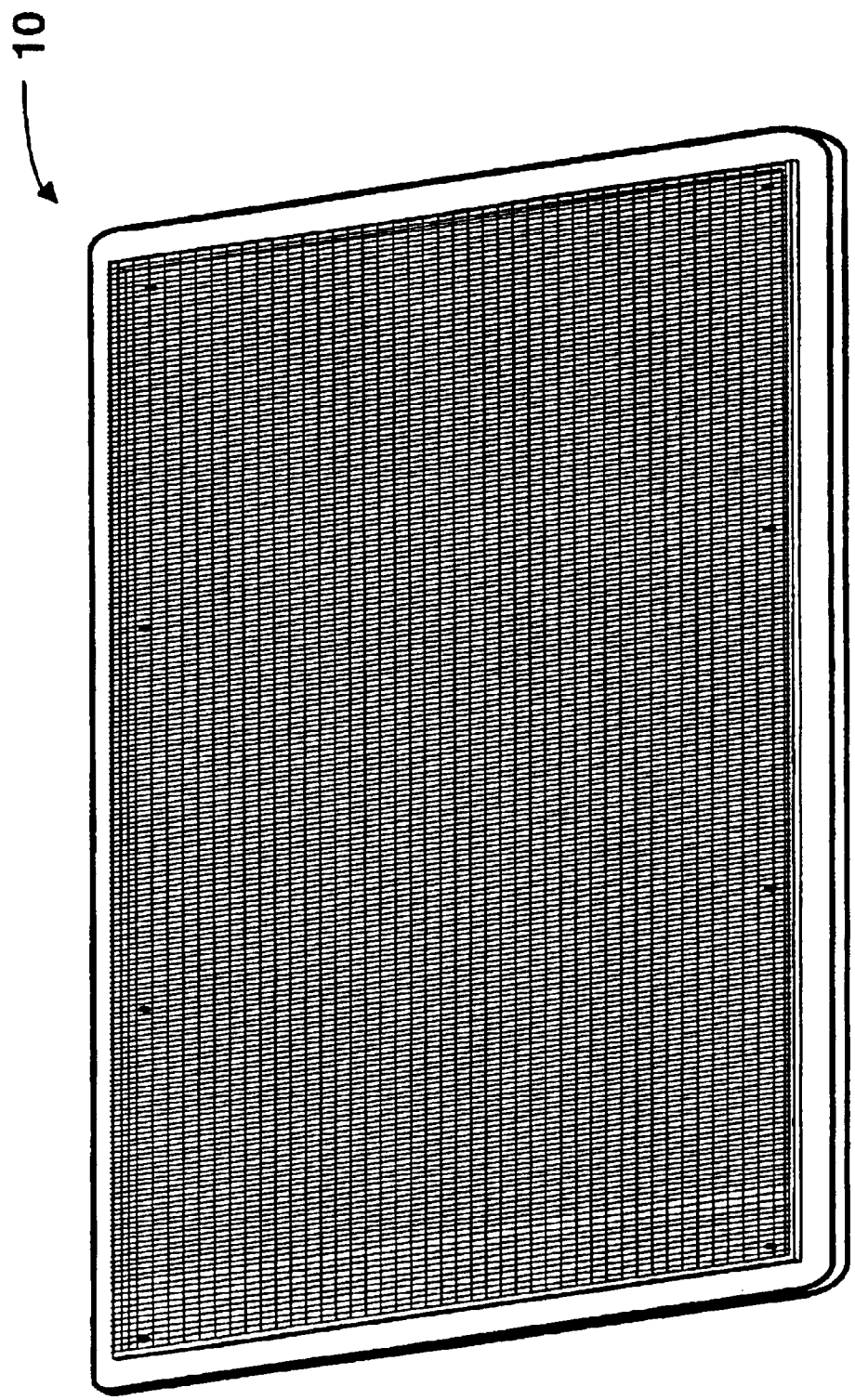
FIG. 1 is a perspective representational view of one embodiment of an absorbent mat assembly according to the present invention.
Figure 2:
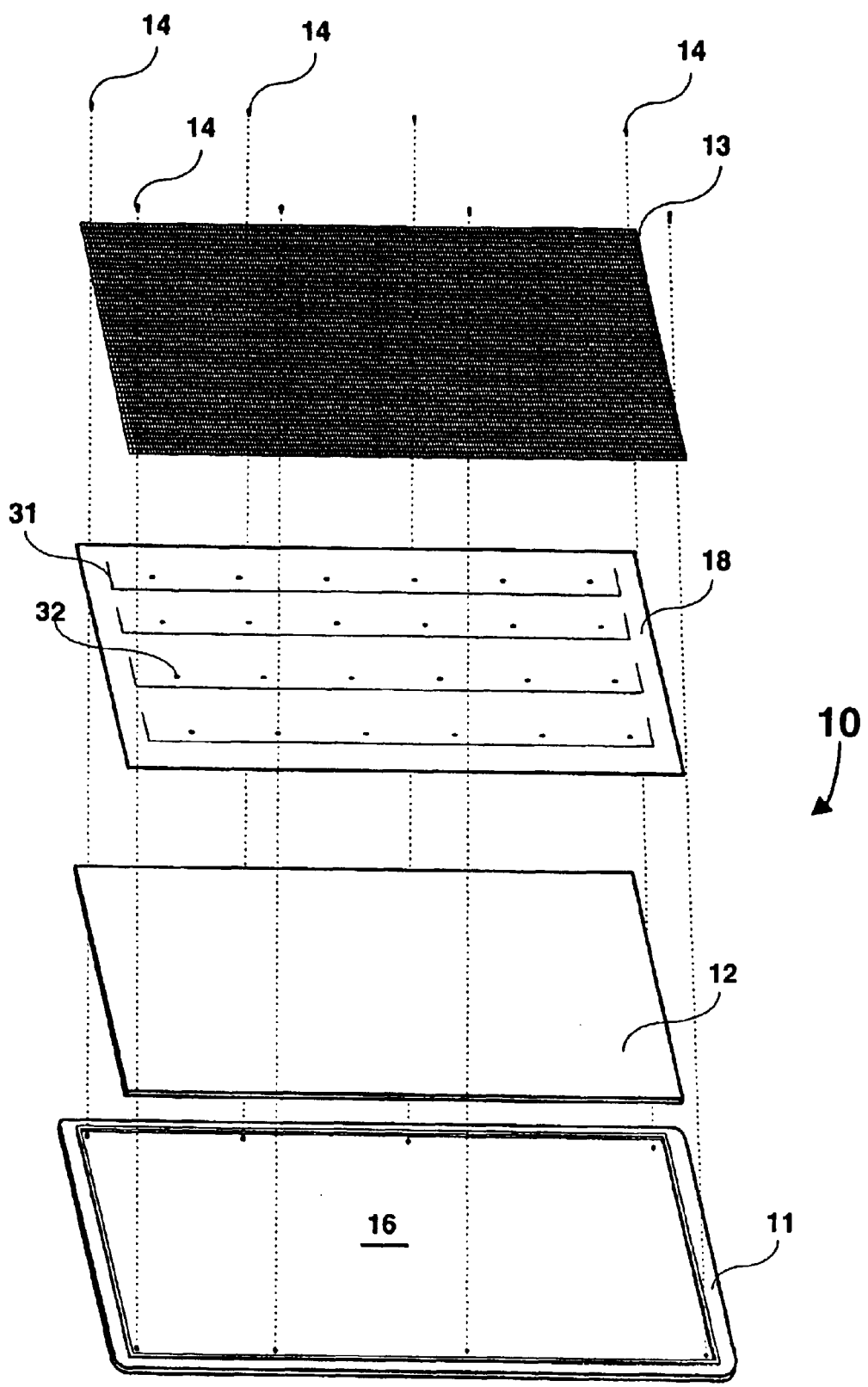
FIG. 2 is an exploded perspective representational view of one embodiment of an absorbent mat assembly according to the present invention.

FIG. 1 shows a perspective representational view of one embodiment of absorbent mat assembly 10 according to the present invention. Similarly, FIG. 2 depicts an exploded perspective representational view of one embodiment of absorbent mat assembly 10 according to the present invention including mat 11. Absorbent pad 12 is disposable within recess 16 of mat 11. Backflow prevention member 18 is disposable within recess 16 and is positioned above absorbent pad 12. Mesh 13 is within mesh recess 17 of mat 11. Mesh 13 is attachable to mat 11 and is removably securable to mat 11 by push pins 14. In FIG. 2 backflow prevention member 18 is shown including a plurality of slots 31 and a plurality of apertures 32.

Figure 3:
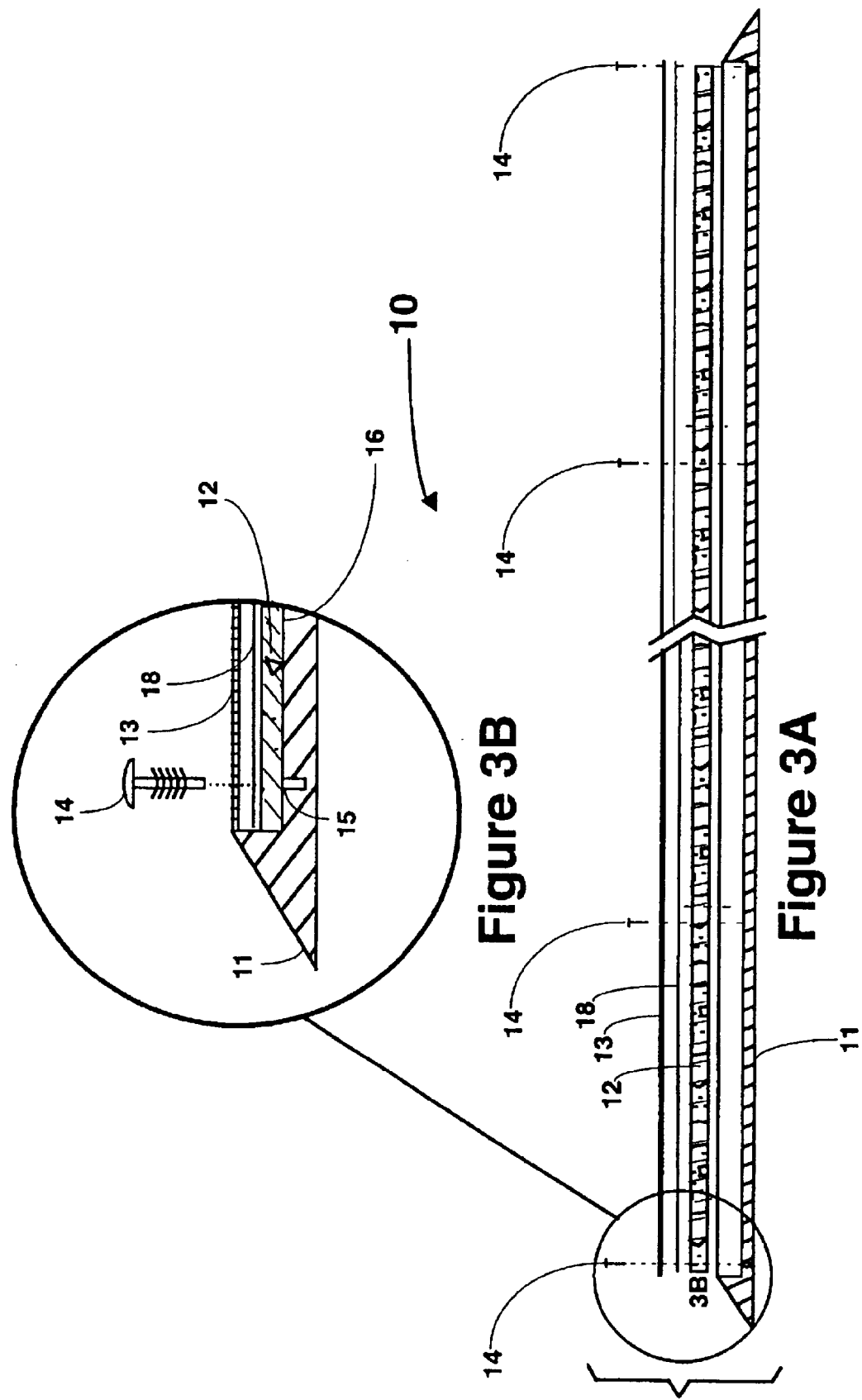
FIG. 3A is an exploded cross-sectional representational view of one embodiment of an absorbent mat assembly according to the present invention.
FIG. 3B is a cross-sectional representational detail view of one embodiment of an absorbent mat assembly according to the present invention.

FIG. 3A is an exploded cross-sectional representational view of one embodiment of absorbent mat assembly 10. Absorbent mat assembly 10 is shown including mat 11. Mat 11 is configured having lip 19. Absorbent pad 12 is disposable within recess 16 of mat 11. Backflow prevention member 18 is disposable within recess 16 and is positioned above absorbent pad 12. Mesh 13 disposable within recess 16 and is positioned under backflow prevention member 18. Mesh 13 is attachable to mat 11 and is removably securable to mat 11 by push pins 14.

FIG. 3B, is an exploded cross-sectional representational detail view of one embodiment of absorbent mat assembly 10. Absorbent mat assembly 10 is shown including mat 11. Mat 11 is configured having lip 19. Absorbent pad 12 is disposable within recess 16 of mat 11. Backflow prevention member 18 is disposable within recess 16 and is positioned above absorbent pad 12. Mesh 13 disposable within recess 16 and is positioned under backflow prevention member 18. Mesh 13 is attachable to mat 11 and is removably securable to mat 11 by push pins 14 which are insertable within apertures 15.

Figure 4:
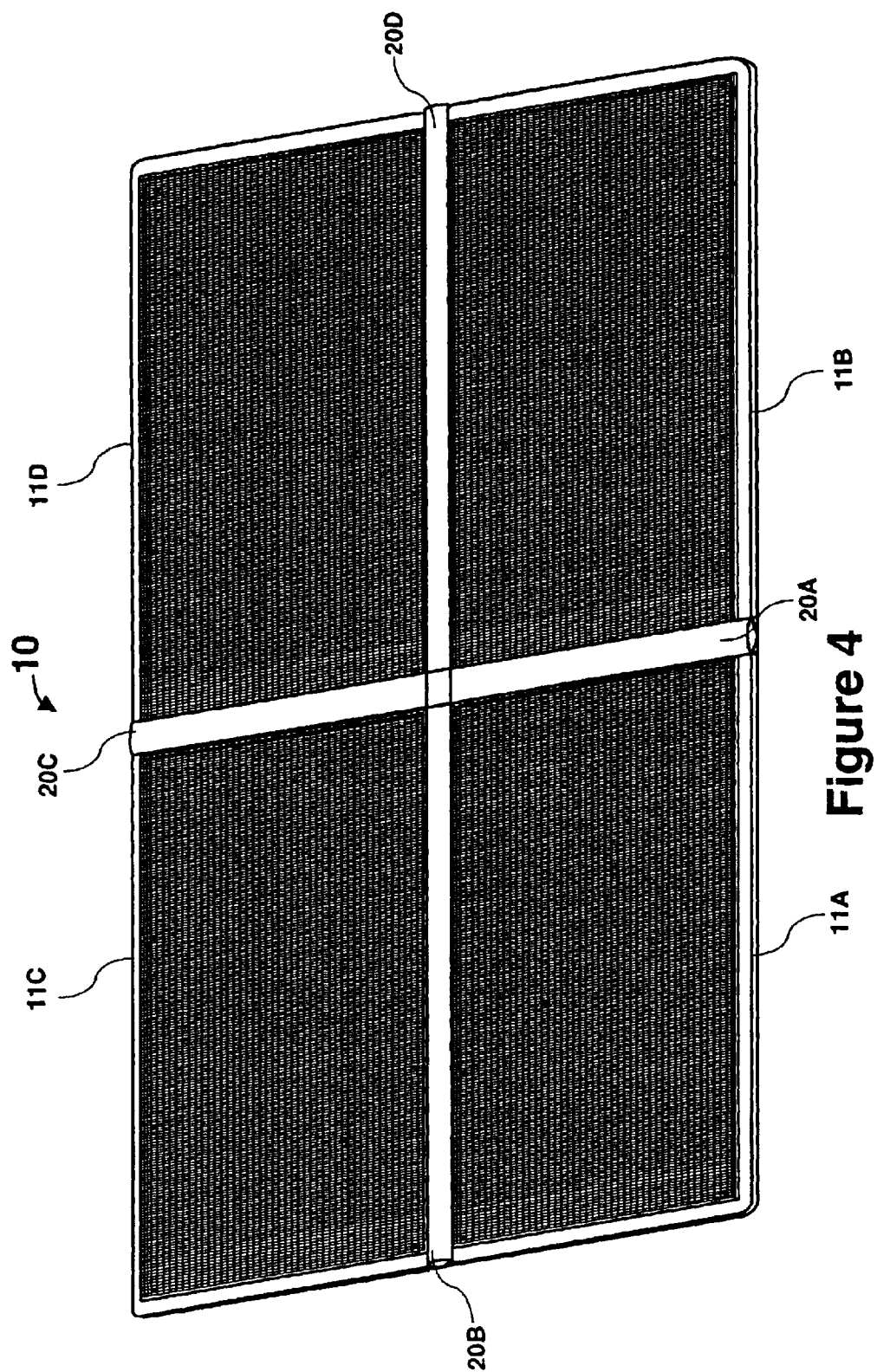
FIG. 4 is a perspective representational view of one embodiment of an absorbent mat assembly including connector strips.
Figure 5:
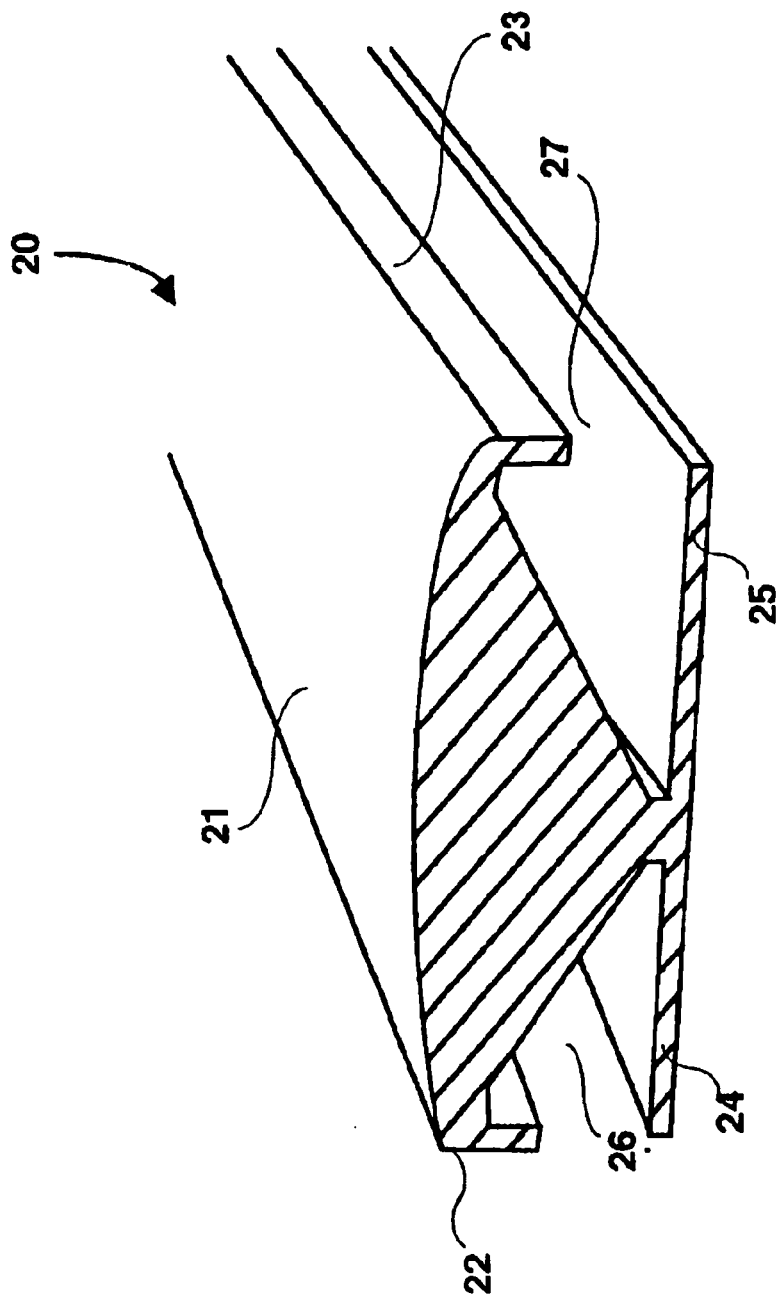
FIG. 5 is a perspective cross-section detail of a connector strip.

FIG. 4 is a perspective representational view of one embodiment of absorbent mat assembly 10, including first, second, third and fourth mats 11A, 11B, 11C and 11D respectively. Mats 11A, 11B, 11C and 11D are joined by connector strips 20A through 20D. As shown in FIG. 5, connector strip 20 includes body portion 21 having first and second mat engaging tabs 22 and 23 and first and second feet 24 and 25. Connector strip 20 is further configured having first mat engaging channel 26 and second mat engaging channel 27.

Figure 6:
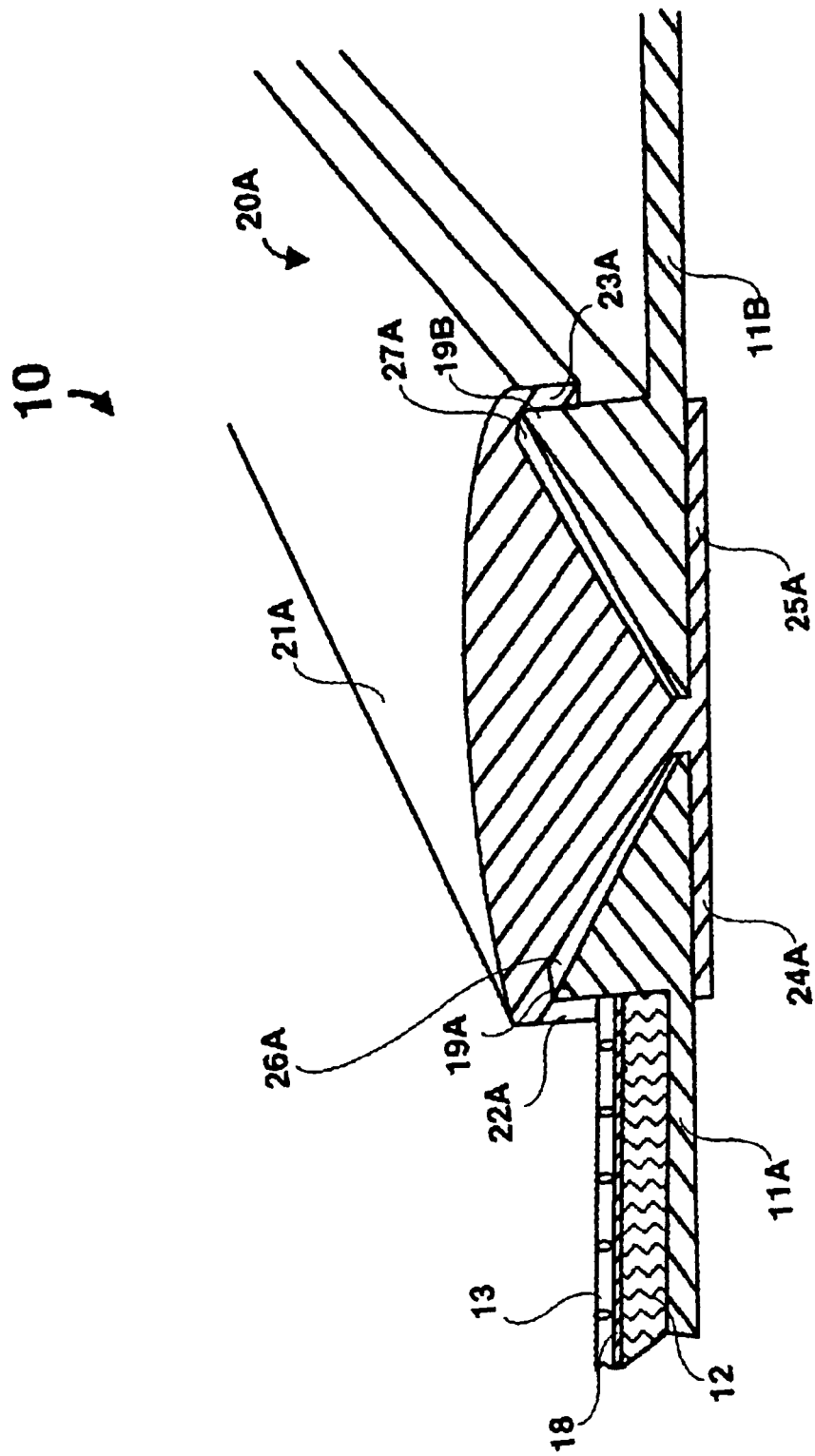
FIG. 6 is a perspective cross-section detail of a connector strip connecting a pair of absorbent mat assembly mats.

FIG. 6 is a perspective cross-section detail of absorbent mat assembly 10 including connector strip 20A connecting first mat 11A and second mat 11B. Connector strip 20A includes body portion 21A having first and second mat engaging tabs 22A and 23A and first and second feet 24A and 25A. Mats 11A, 11B are shown engaging first mat engaging channel 26A and second mat engaging channel 27A respectively. First mat engaging tab 22A overlaps lip 19A of mat 11A and second mat engaging tab 21B overlaps lip 19B of mat 11B. First foot 24A and second foot 25A extend beneath first mat 11A and 11B respectively.

FIGS. 7A and 8A show an alternate embodiment of absorbent mat assembly 110 including mat 111, absorbent pad 112 and mesh 113 which is retained in position with regard to mat 111. Mat 111 is formed so as to include recess 135. Absorbent pad 112 is positioned within recess 135. As seen in FIGS. 7B and 8B, recess 135 includes generally upright side wall 130 which extends about a lower perimeter of recess 135. Recess 135 is also formed including land 132, which in the embodiment shown is formed contiguous to and substantially perpendicular to the substantially upright side wall 130. Mesh 113 is removably attachable to mat 111 by connectors 114. As seen in FIGS. 7B and 8B, mesh 113 is formed including ear 133 that extends about a periphery of a generally thicker center portion 137 of mat 111. The generally thicker center portion 137 of mesh 113 is characterized by face 131. Connector 114 extends through aperture 136 formed through ear 133 of mesh 113 and into aperture 134 formed in mat 111. When assembled, ear 133 of mesh 113 seats upon land 132 and face 131 of the generally thicker center portion 137 of mat 111 inserts snugly into recess 135 against upright side wall 130. This feature of the invention permits a snug retention of mesh 113 within recess 135 of mat 111 with face 131 of the generally thicker center portion 137 of mat 111 frictionally engaging the upright side wall 130 of recess 135.

While this invention has been described with reference to the described embodiments, this is not meant to be construed in a limiting sense. Various modifications to the described embodiments, as well as additional embodiments of the invention, will be apparent to persons skilled in the art upon reference to this description, the drawings and the appended claims. It is therefore contemplated that the appended claims will cover any such modifications or embodiments as fall within the true scope of the invention.

I claim:

1. An absorbent mat assembly comprising:
   a mat including a raised perimeter forming a recess having a substantially upright side wall and a land formed contiguous to the substantially upright side wall;
   an absorbent pad having a perimeter substantially equal to a perimeter of the recess, the absorbent pad disposed within the recess;
   a fluid permeable mesh secured to the mat, the fluid permeable mesh including an ear extending from a periphery of the fluid permeable mesh, the ear configured to seat upon the land of the mat; and
   a connector for removably securing the fluid permeable mesh to the mat.

2. The absorbent mat assembly of claim 1 wherein the mat further comprises a material formulated of recycled polymer.

3. The absorbent mat assembly of claim 1 wherein the mat further comprises a petroleum impermeable material.

4. The absorbent mat assembly of claim 1 wherein the absorbent pad further comprises a polypropylene pad.

5. The absorbent mat assembly of claim 4 wherein the polypropylene pad further comprises a woven polypropylene backer and a spun polypropylene liner attached to the woven polypropylene backer.

6. The absorbent mat assembly of claim 1 wherein the absorbent pad further comprises a reusable pad.

7. The absorbent mat assembly of claim 1 wherein the absorbent pad further comprises a washable pad.

8. The absorbent mat assembly of claim 1 wherein the absorbent pad further comprises a recyclable pad.

9. The absorbent mat assembly of claim 1 further comprising a backflow prevention member disposed between the mat and the absorbent mat, the backflow prevention member including a sheet of polymeric material.

10. The absorbent mat assembly of claim 1 wherein the petroleum resistant mesh further comprises an extruded polymeric mesh.

11. The absorbent mat assembly of claim 1 wherein the mesh retaining element further comprises a plastic retaining stud insertable within an aperture formed within the mat.

12. An absorbent mat assembly comprising:
- a mat including a raised perimeter forming a recess having a substantially upright side wall and a land formed contiguous to the substantially upright side wall;
- a reusable absorbent pad placed within the recess, the reusable absorbent pad having a perimeter substantially equal to a perimeter of the recess;
- a backflow prevention member disposed within the recess against an upper surface of the absorbent pad;
- a fluid permeable mesh secured to the mat, the fluid permeable mesh including a center portion including a face disposed about a periphery of the center portion of mesh, the fluid permeable mesh including an ear extending from the center portion of the fluid permeable mesh in a plane substantially perpendicular to a surface of the face disposed about the periphery of the center portion of mesh, the ear configured to seat upon the land of the mat; and
- a mesh retaining element for removably securing the petroleum resistant mesh to the mat.

13. The absorbent mat assembly of claim 12 wherein the mat further comprises a petroleum impermeable material.

14. The absorbent mat assembly of claim 12 wherein the absorbent pad further comprises a polypropylene pad.

15. The absorbent mat assembly of claim 14 wherein the polypropylene pad further comprises a woven polypropylene backer and a spun polypropylene liner attached to the woven polypropylene backer.

16. The absorbent mat assembly of claim 12 wherein the backflow prevention member further comprises a sheet of polymeric material.

17. The absorbent mat assembly of claim 12 wherein the petroleum resistant mesh further comprises an extruded polymeric mesh.

* * * * *